United States Patent Office 2,725,146
Patented Nov. 29, 1955

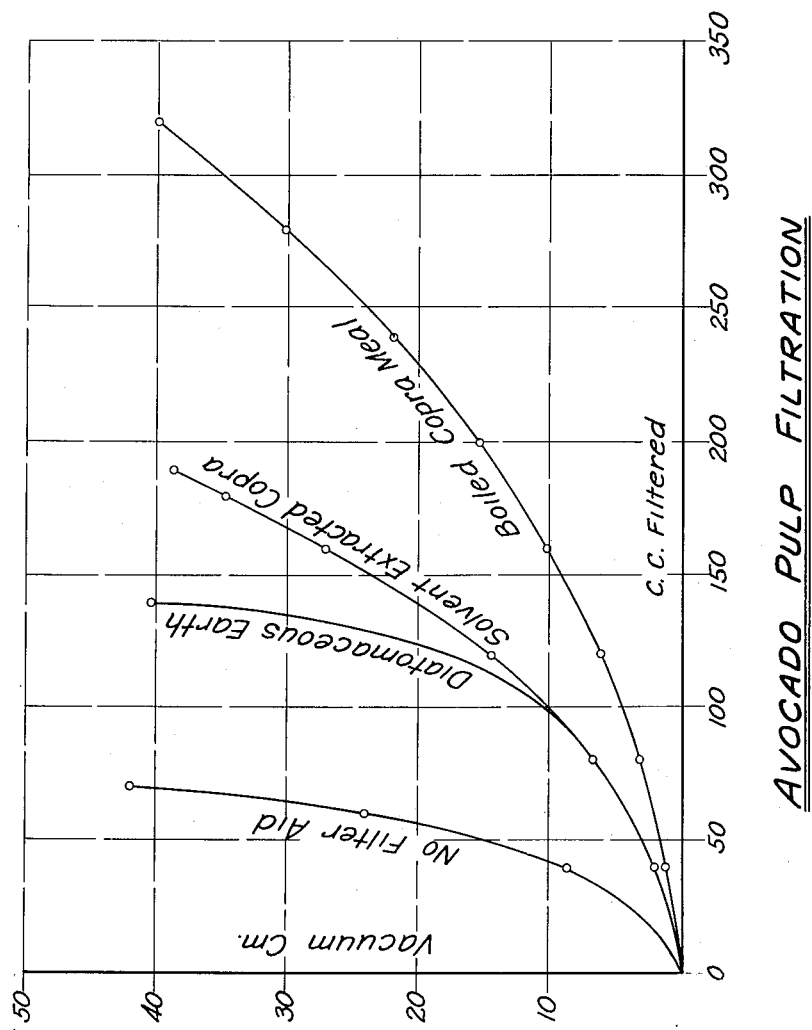

2,725,146

FILTRATION

William A. Forbes, Napa, Calif., assignor of one-half to Robert P. Forbes

Application August 16, 1952, Serial No. 304,797

6 Claims. (Cl. 210—203)

This invention relates to a novel method of filtration and, more specifically, it relates to the use of various forms of coconut meat as a filter aid in the filtration of substances which are ordinarily difficult to filter.

Filter aids are well-known in the industry and are ordinarily used to expedite filtration so that gummy or gelatinous substances will not clog a given filter so rapidly. In the filtration of many substances, such as fruit pulp, the nature of the material being filtered is such that with a conventional filter the pulp forms an almost impermeable layer over the filter before a substantial volume of the pulp has been filtered. Although conventional filter aids such as diatomaceous earth are of some help in such filtration problems, such filtration aids are not a complete answer for several reasons. In the first place, the filter aids heretofore known are not very efficient and, although the filtration capacity on the filter is increased to a degree, the volume which may be passed through the filter before the filter is clogged may still be small. In the second place, the common filter aids are not edible substances and, if one wishes to retain and utilize the solid portion of the material being filtered, it is necessary to effect separation between the filter aid and the other solid material. This separation may prove to be as difficult as the filtration of the original starting material.

I have found that coconut meat, in various forms, is an efficient filter aid for the filtration of gummy or gelatinous substances. As will be later shown, the efficiency of the coconut meat is much greater than filter aids heretofore known. In addition, the coconut meat itself is a valuable food substance so it does not contaminate the filter cake with an inedible substance, but it actually adds food value to the filter cake.

It is therefore an object of the present invention to provide a method of filtration whereby gelatinous substances can be handled in a simple and economical manner.

It is another object of this invention to provide a process wherein a filter aid is employed which is a valuable food substance.

Coconut meat has a unique fibrous structure which enables it to act as a filter aid for substances which could otherwise be filtered only with great difficulty. The coconut meat may be in any form. If the product is desired for human consumption, it is ordinarily preferred to use the meat from fresh ground coconuts. However, fresh coconut meat is expensive and, in many applications of the present invention, copra meal may be utilized with equal advantage.

In the preparation of coconut oil, coconut meats are separated from the shells and dried, either in the sun or in a kiln. This produces a copra of commerce, which is then ordinarily ground and the oil removed, either by heating in the presence of water, by mechanical extraction, by solvent extraction, or by a combination of these methods. The copra itself, or the copra meal, which is left after the oil is extracted, may be used in the present invention, although the copra press cake, ground to a suitable fineness, is ordinarily preferred because of its low cost. When copra is extracted by the use of solvents, the amount of oil left in the copra is very small, ordinarily on the order of 1.5%. When copra is subjected to mechanical expression, the fat content is somewhat higher, on the order of 6%. Mixtures of expeller cake and solvent extracted residue are frequently blended to yield a copra meal containing about 4%–5% of fat and rehydrated to 10%–11% moisture, and this is the ordinary copra meal of commerce which is termed in the trade "shippable meal."

Fresh coconut meat may be handled and extracted in exactly the same way as copra, but is ordinarily more expensive. One particularly suitable form of filter aid may be made by boiling fresh coconut meat with water for a period of about one-half hour, washing the meat with water until the filtrate is clear, and drying the resulting product. This produces a defatted fresh coconut which is fit for human consumption and which is efficient as a filter aid. Thus, when this material is used as a filter aid for an aqueous fruit pulp, the filter cake which contains both the fruit pulp and the coconut is entirely suitable for use as a human food.

Copra meal may also be boiled with water, to extract the water soluble substances therefrom, and the boiling has been found to increase its efficiency as a filter aid.

Preferably, the coconut meat is ground to a fairly fine state of subdivision for use in carrying out the present invention. Although coconut meat in any form may be used, it is preferred that the material be ground, but that it not be ground too fine. I have found that material which just passes through a 10 mesh screen is entirely suitable for use in carrying out the present invention.

The coconut meat may be mixed with the substance to be filtered, or it may be used as a precoating on a conventional filter.

A number of tests were conducted to show the effectiveness of various forms of coconut meat when used as a filter aid. In making these tests, a number of different substances having widely varied properties were selected to show the effect of coconut meat when filtering these different substances. All of the substances selected were substances which are known to be very difficult to filter. The following examples are given for purposes of illustration only and the application of the invention is not limited to these specific substances.

In making the tests, a Bushner funnel was used having a diameter of 2.4 inches, with a sheet of No. 4 Watman filter paper thereon. A vacuum pump was used to draw a vacuum on the filter and a monometer was used to measure the vacuum. In each case, the degree of vacuum was regulated to produce as near a constant rate of filtration as is possible. The rate selected was two drops per second, or about four gallons per square foot per hour. As the filtration progressed, the vacuum was increased to maintain the filtration rate. When the rate slowed down to about one drop in ten or fifteen seconds, the run was terminated and the quantity of filtrate measured.

In the tests on coconut meat, a thin slurry of the coconut meat was first made and passed through the filter to give a precoat on the filter paper. About five grams of the coconut meat, or other filter aid, was used in each instance, which gave a precoat thickness of about $\frac{1}{16}''$ to about $\frac{1}{8}''$.

*Tomatoes.*—Tomatoes were selected as one of the test materials since tomatoes are extremely high in water, are low in carbohydrates and ash, and contain about the average amount of protein, fat and fiber. 100 grams of fresh, whole tomatoes was mixed with 300 cc. of water and the mixture homogenized. The mixture was then diluted to 500 cc. with water, so that the finished mixture contained 20% by weight of the original pulp. When this mixture had been passed through a filter at a substantially constant filtration rate, on a filter which had been precoated with five grams of solvent extracted coconut meal, the material filtered rapidly and 85 ml. of filtrate were obtained before the filtration rate slowed down to about one drop per fifteen seconds. At this point, the vacuum was 23.5 cm. of mercury. On the other hand, another portion of this mixture was passed through a similar filter but which had not been precoated; the filtration rate slowed down to about one drop per twenty seconds when the vacuum reached 23.9 cm., and at this point only 50 ml. of filtrate had been obtained. In other words, about 1.7 times as much filtrate was obtained when the copra meal was used as a filter aid.

*Cottage cheese.*—Cottage cheese was selected as one of the test materials since it is very high in protein, about average in moisture, and low in fat, carbohydrates and ash. The cottage cheese was made from skimmed milk, and contained 76.5% moisture and 19.5% protein. It made up into a 10% suspension with water and passed through ordinary and precoated filters, as before. On the filter having a copra meal precoat, 450 cc. of filtrate was obtained, at a vacuum of 38.5 cm., while when a similar sample was passed through the filter without a precoat, 260 cc. of filtrate was obtained at a vacuum of 38.5 cm. In both instances, the rate of flow had slowed down to about one drop per fifteen seconds. Thus, by the use of the copra meal precoat, the yield of filtrate was increased from 260 cc. to 450 cc., or a ratio of 1 to 1.7.

*Bananas.*—Bananas were selected as one of the materials to be tested because bananas are high in carbohydrates, low in protein, fat, fiber and ash, and about average in moisture content. Bananas contain about 74.8% moisture and 23% carbohydrates. 100 grams of ripe banana pulp was mixed with 300 cc. of water, homogenized, and diluted to a total volume of 500 cc. with water. Thus, the suspension contained 20% by weight of the original banana pulp. Samples of the banana pulp mixture were passed through filters, as before. One of the filters had been precoated with five grams of copra meal, while the other was untreated. On the untreated filter, 30 cc. of filtrate was obtained at a vacuum of 23.5 cm., at which time there was a sudden slow-down to one drop in fifteen seconds on the filter. On the filter treated with copra meal, 70 cc. of filtrate was obtained at a vacuum of 22.9 cm., at which time the filtration rate slowed down to about one drop in ten seconds. In other words, 70 cm. of filtrate was obtained when using the copra meal precoat and only 30 cc. of filtrate was obtained on a plain filter before the filtration rate dropped to a low value.

*Avocados.*—Avocados were selected as one of the test materials for the reason that they are high in fat, low in protein and about average in moisture, carbohydrates, fiber and ash. The original avocado pulp contained 65.4% moisture, 26.4% fat and about 5% carbohydrates. 50 grams of the avocado pulp was homogenized with 300 cc. of water, whereupon the pulp was diluted to a volume of 1,000 cc., giving a 5% suspension of the avocado pulp. Four samples of the avocado pulp thus prepared were then passed through Buchner funnels. The first of these contained only filter paper, the second contained a precoat of five grams of solvent extracted copra meal, the third had a precoat of five grams of boiled copra meal, prepared as described above, and the fourth had five grams of diatomaceous earth. The diatomaceous earth used was a well-known filter aid sold under the trade name of "Speedplus Dicalite." In each case, filtration was continued at a substantially constant rate until the filtration rate had slowed down to about one drop per fifteen seconds. The results of this series of tests, are shown graphically on the drawing which forms a part of this specification. Although the drawing is largely self-explanatory, it will be noted that on the plain filter, 70 cc. of filtrate was obtained at a vacuum of 42.1 cm., with the solvent extracted copra precoat 190 cc. of filtrate was obtained with a vacuum of 38.4 cm., with the boiled copra precoat 320 cc. of filtrate was obtained with a vacuum of 39.9 cm., and with the diatomaceous earth, 140 cc. of filtrate was obtained with a vacuum of 40.5 cm. Thus, it will be seen that ordinary solvent extracted copra meal is a much better filter aid than diatomaceous earth, which is commonly used for this purpose and that the efficiency of the copra meal can be even further increased by boiling it.

*Apples.*—About 100 grams of fresh, whole apples, exclusive of core and seeds, was homogenized with 300 cc. of water. The mixture was diluted to 1,000 cc., giving a 10% suspension of the apple pulp. In this instance, the plain filter was compared with a filter which had been precoated with five grams of expeller cake copra meal which had been screened to −10 mesh. On the plain filter, 190 cc. of filtrate was obtained at a vacuum of 37.8 cm., while with the filter precoated with the expeller cake meal, 380 cc. of filtrate was obtained at a vacuum of 39.8 cm.

*Carrots.*—300 grams of fresh whole carrots and 500 cc. of water were homogenized and diluted to 1,000 cc., giving a 30% suspension of the original carrot pulp. In this experiment, the filter aid selected was solvent extracted coconut meat. This coconut meat was prepared as described above. With a plain filter, 80 cc. of filtrate was obtained, at a vacuum of 39.4 cm., while the filter precoated with the solvent extracted coconut meat yielded 440 cc. of filtrate at a vacuum of 23.5 cm.

I claim:

1. A process for the filtration of an aqueous slurry containing fruit waste comprising adding to the fruit waste ground coconut meal and filtering the mixture thus produced said ground coconut meal being ground to a fineness whereby it just passes through a 10 mesh screen.

2. A filter for the filtration of gelatinous substances comprising a backing layer of a porous adherent sheet, and a coating thereon consisting of a thin layer of ground coconut meat said ground meat being ground to a fineness whereby it just passes through a 10 mesh screen.

3. A process for the filtration of a gelatinous substance comprising adding to the gelatinous substance the ground meat of the coconut, said ground meat being ground to a fineness whereby it just passes through a 10 mesh screen, and filtering the mixture thus produced.

4. The process of claim 3 wherein the amount of coconut meat added is from 5% to 20% by weight of the gelatinous material.

5. The process for the filtration of a gelatinous material comprising adding to the material copra meal and filtering the mixture thus produced.

6. A process for the filtration of gelatinous material comprising adding to the gelatinous material defatted ground coconut meal, said meal being ground to a fineness whereby it just passes through a 10 mesh screen, and filtering the mixture thus produced.

References Cited in the file of this patent

UNITED STATES PATENTS

| | | |
|---|---|---|
| 113,491 | Brown | Apr. 11, 1871 |
| 1,632,458 | Thatcher | June 14, 1927 |
| 1,686,095 | Manning | Oct. 6, 1928 |
| 1,691,001 | Vallez | Nov. 6, 1928 |
| 1,946,039 | Staritzky | Feb. 6, 1934 |

OTHER REFERENCES

Ramirez: Chem. Abstr. 35; $1255^2$, 1941.

Menon: (Abstract) Institute of Paper, Chem. Bull., vol. 15, p. 203, February 1945.